(12) United States Patent
Saigal et al.

(10) Patent No.: US 9,834,123 B2
(45) Date of Patent: Dec. 5, 2017

(54) RETAINING CLIP FOR A DOOR ASSEMBLY

(71) Applicant: FORD GLOBAL TECHNOLOGIES, LLC, Dearborn, MI (US)

(72) Inventors: Vikas Saigal, Melbourne (AU); Michael Neumann, Gisborne (AU)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 3 days.

(21) Appl. No.: 14/922,697

(22) Filed: Oct. 26, 2015

(65) Prior Publication Data

US 2017/0113590 A1 Apr. 27, 2017

(51) Int. Cl.
*E05D 7/10* (2006.01)
*E05D 5/14* (2006.01)
*B60N 3/10* (2006.01)

(52) U.S. Cl.
CPC .............. *B60N 3/102* (2013.01); *E05D 5/14* (2013.01); *E05D 7/1022* (2013.01); *E05D 2005/145* (2013.01)

(58) Field of Classification Search
CPC .. B60N 3/10; B60N 3/102; E05D 5/12; E05D 5/127; E05D 5/14; E05D 5/16; E05D 2005/145; E05D 7/1022
See application file for complete search history.

(56) References Cited

U.S. PATENT DOCUMENTS

| | | | |
|---|---|---|---|
| 4,813,582 A | 3/1989 | Henricksen et al. | |
| 5,289,962 A | 3/1994 | Tull et al. | |
| 5,657,969 A | 8/1997 | Bivens | |
| 6,196,434 B1 | 3/2001 | Angran et al. | |
| 6,637,709 B1 | 10/2003 | Guenther et al. | |
| 6,732,894 B2 | 5/2004 | Hubbert et al. | |
| 2002/0179795 A1 | 12/2002 | Bergin | |
| 2004/0107539 A1* | 6/2004 | Lu | G06F 1/1681 16/342 |
| 2005/0224674 A1 | 10/2005 | Park | |
| 2007/0155202 A1* | 7/2007 | Chuang | G06F 1/1616 439/131 |
| 2011/0085289 A1* | 4/2011 | Park | G06F 1/1681 361/679.27 |
| 2014/0033477 A1* | 2/2014 | Wang | G06F 1/1681 16/376 |
| 2017/0113590 A1* | 4/2017 | Saigal | E05D 5/14 |

* cited by examiner

*Primary Examiner* — Gregory Blankenship
(74) *Attorney, Agent, or Firm* — Vichit Chea; King & Schickli, PLLC

(57) ABSTRACT

A clip for a vehicle door assembly includes a base, a plurality of fingers forming an expandable opening, and an arm extending from the base for locating the clip within the door assembly. Each of the fingers includes an inward projecting tab at least partially defining the expandable opening such that a tip of a pin contacts the inward projecting tabs during insertion of the pin causing the plurality of fingers to expand outward to an expanded position allowing the pin to enter the expandable opening until the inward projecting tabs align with a groove formed in the pin adjacent the tip wherein the inward projecting tabs enter the groove allowing the plurality of fingers to return to a natural position and secure the pin in position. Inner and outer members of the door assembly secure the clip therebetween for receiving pins associated with movement of the door.

17 Claims, 9 Drawing Sheets

RETAINING CLIP FOR A DOOR ASSEMBLY

TECHNICAL FIELD

This document relates generally to retaining clips for vehicle interiors, and more specifically to a door assembly having a retaining clip.

BACKGROUND

Automotive interiors often feature a number of compartments in various locations, such as along the center console or the instrument panel. Such compartments may have a door associated therewith to allow an occupant of the vehicle to alternately open and close the compartment. The spatial requirements of a vehicle interior have resulted in such doors being movably mounted with respect to associated compartments in various "moving axis" configurations. Such configurations allow the edges of the doors to be spaced flush with respect to adjacent vehicle interior surfaces with a minimal gap therebetween, while still allowing reliable opening and closing of the respective door. Further, such moving axis configurations can allow for a door, when open, to retract into the console, adjacent to or within the associated compartment.

In one such design, the assignee of the present application created an initial design for a cup holder door wherein a dampener carrier pin was press inserted inside a door inner member that was already welded to a door outer member. A groove on the end of the dampening carrier pin was made to engage with an "L" shaped feature inside of the door assembly during press fit operation. In this manner, the dampening carrier pin was retained in position during the function of door movement. While sufficient to retain the dampening carrier pin for a certain number of cycles of the door, a greater number of cycles of the door is desired. Accordingly, there is a need for a retaining clip made of a robust materials for use within a door assembly capable of retaining a pin in position for a significant number of cycles of the door assembly. This is particularly true given the fact that the retaining feature is positioned within a welded assembly making it difficult to repair in the event of failure or dislodgement.

SUMMARY OF THE INVENTION

In accordance with the purposes and benefits described herein, a clip for receiving a pin in a door assembly in a vehicle is provided. The clip may be broadly described as including a base, a plurality of fingers extending from the base and forming an expandable opening for receiving the pin, and an arm extending from the base for securing the clip within the door assembly.

In one possible embodiment, the base is substantially perpendicular to the arm extending from the base. In another possible embodiment, the clip further includes a projection extending from the arm, or the base in yet another embodiment, in a direction generally opposite a direction the plurality of fingers extend from the base for at least partially securing the clip in position within the door assembly.

In still another possible embodiment, each of the plurality of fingers includes an inwardly projecting tab at least partially defining the expandable opening such that a tip of the pin contacts the inward projecting tabs during insertion of the pin causing the plurality of fingers to expand outward to an expanded position allowing the pin to enter the expandable opening until the inward projecting tabs align with a groove formed in the pin adjacent the tip wherein the inward projecting tabs enter the groove allowing the plurality of fingers to return to a natural position and secure the pin in position.

In one other possible embodiment, the inwardly projecting tabs of the plurality of fingers form a ball bearing joint with the groove in the pin.

In yet still another possible embodiment, the base is substantially perpendicular to the arm extending from the base.

In another possible embodiment, the clip further includes a projection extending from the base opposite the plurality of fingers for securing the clip in position within the door assembly.

In any of the above embodiments, the clip may be a polyoxymethylene, an acetal, or a poly formaldehyde.

A vehicle incorporating any of the clips for receiving a pin in a door assembly described above.

In one additional possible embodiment, a door assembly associated with a compartment in a vehicle for rotation between open and closed positions includes an inner member receiving first and second clips, each of the first and second clips having a plurality of fingers extending from a base and forming an expandable opening, an outer member attached to the inner member and securing the first and second clips between the inner and outer members, and a pair of arms rotatably coupled to the inner member using pins.

In another possible embodiment, the outer member includes at least one tab extending toward the inner member, the at least one tab for receiving an end portion of at least one arm extending from at least one of the first and second clips.

In still another possible embodiment, the inner member includes at least one channel for receiving at least one base of at least one of the first and second clips.

In yet another possible embodiment, the door assembly further includes at least one wall extending from the inner member, the at least one wall having an aperture formed therein for receiving a projection extending from at least one of the first and second clips.

In one additional possible embodiment, the expandable opening formed by the plurality of fingers of each of the first and second clips is configured to receive a tip of a pin, the pin having a groove formed adjacent the tip.

In another possible embodiment, each of the plurality of fingers of the first and second clips includes a tab adjacent an end such that the tip of the pin contacts the tabs during insertion of the pin causing the plurality of fingers to expand outward to an expanded position allowing the pin to enter the expandable opening until the tabs align with the groove wherein the tabs enter the groove allowing the plurality of fingers to return to a natural position and secure the pin in position.

In still one additional possible embodiment, a door assembly associated with a cup holder in a vehicle for rotation between open and closed positions includes an inner member having a first surface, the first surface defining portions of cup holder portions of the cup holder, an outer member attached to the inner member and securing first and second clips between the inner and outer members, and a pair of arms rotatably coupled to the inner member.

In another possible embodiment, each of the first and second clips include a plurality of fingers having inward projecting tabs at least partially defining an expandable opening for receiving and securing a pin within the expandable opening.

In one other possible embodiment, each of the first and second clips is a polyoxymethylene, an acetal, or a poly formaldehyde.

A vehicle incorporating any of the door assemblies for a vehicle described above.

In the following description, there are shown and described several preferred embodiments of the retaining clips and door assemblies associated with cup holder assemblies for a vehicle. As it should be realized, the clips and door assemblies are capable of other, different embodiments and their several details are capable of modification in various, obvious aspects all without departing from the assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the clips and door assemblies for a vehicle and together with the description serve to explain certain principles thereof. In the drawing figures.

Figure 10:
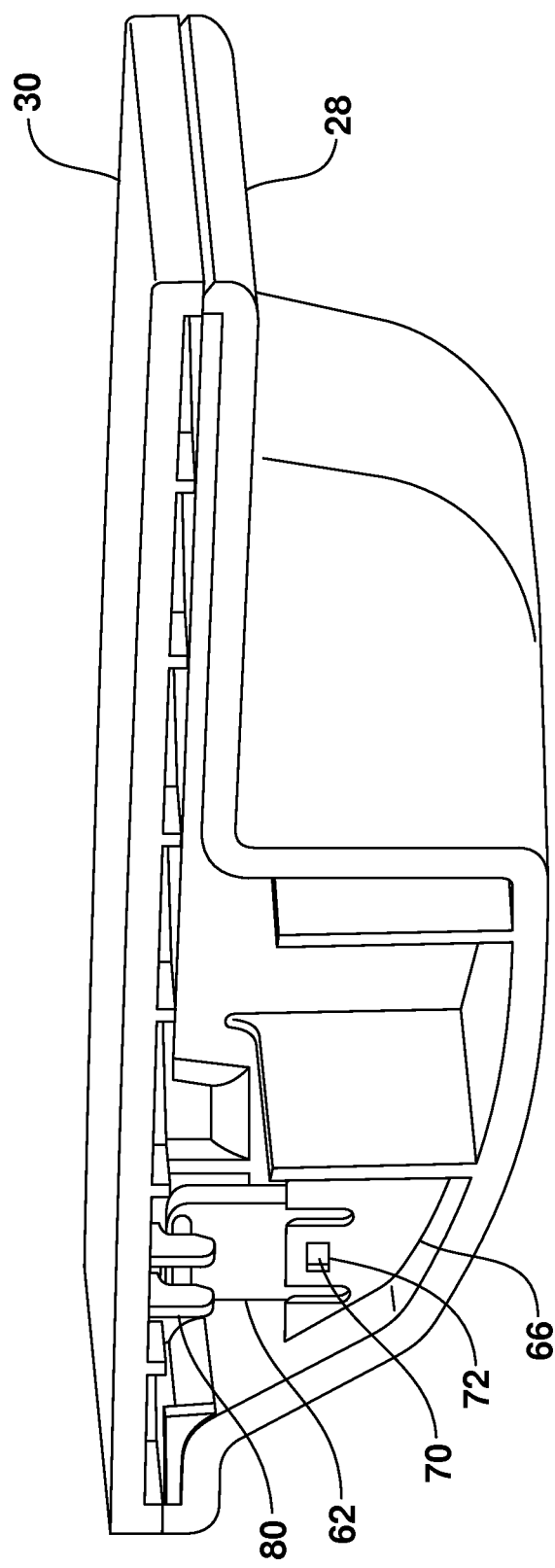
Figure 11A:
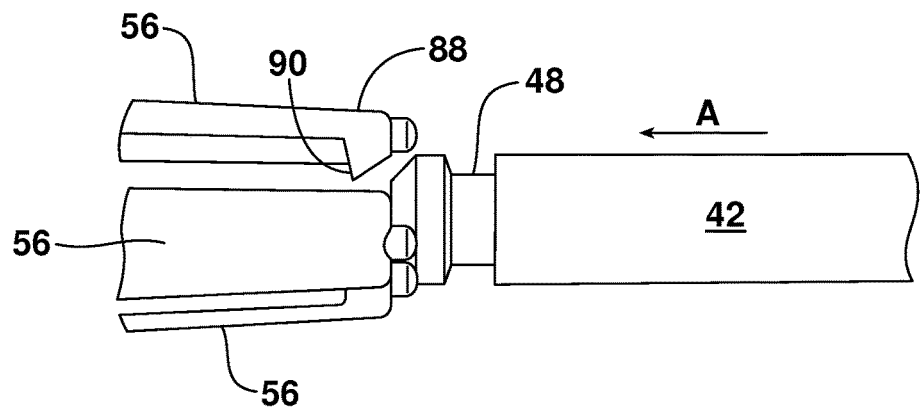
Figure 11B:
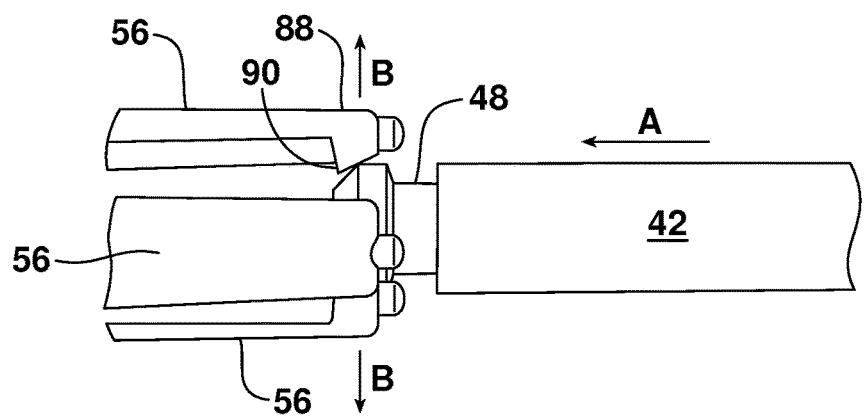
Figure 11C:
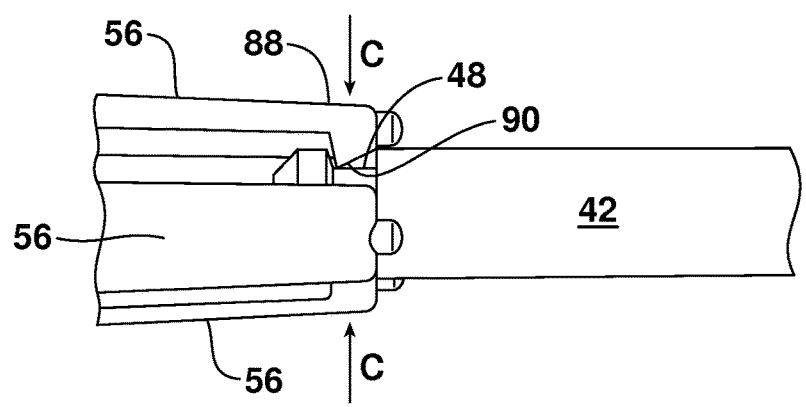

FIG. 10 is a section view of a door assembly showing the clip positioned within the pocket formed in the outer member and the arm of the clip extending toward and positioned between tabs of the inner member; and FIGS. 11a-11c are partial perspective views of a pin engaging the extendable fingers of the clip, forcing the fingers to expand outwardly so that the pin can enter the opening formed by the fingers, and the fingers engaging a groove in the pin once inserted to prevent withdrawal of the pin.

Reference will now be made in detail to the present preferred embodiments of the clip and door assemblies for a vehicle, examples of which are illustrated in the accompanying drawing figures, wherein like numerals are used to represent like elements.

DETAILED DESCRIPTION

Figure 1:
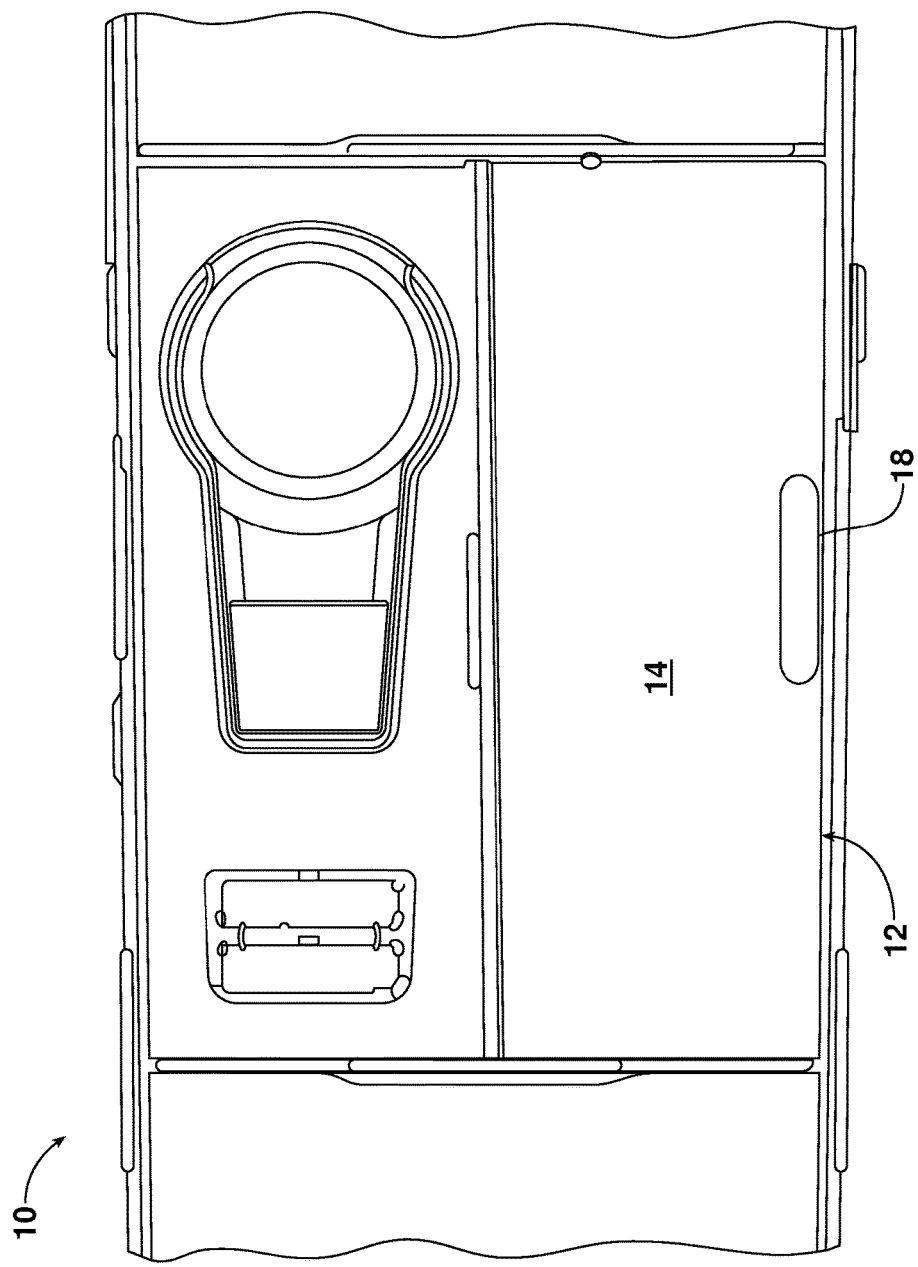
FIG. 1 is a top view of a center console assembly of a vehicle including a cup holder assembly shown in a closed position.

Reference is now made to FIG. 1 that illustrates a center console assembly 10 of a vehicle (not shown). In the described embodiment, the center console assembly 10 includes a cup holder assembly 12 positioned along a passenger side of the center console assembly. In alternate embodiments, the cup holder assembly 12 could be positioned along a driver side of the center console assembly 10 or transverse to the center counsel assembly for receiving a cup on one or both of the driver side and/or the passenger side. The cup holder assembly 12 includes a door assembly 14 operatively mounted over a compartment 16. A latch 18 secures the door assembly 14 in position over the compartment 16 in a closed position.

Figure 2:
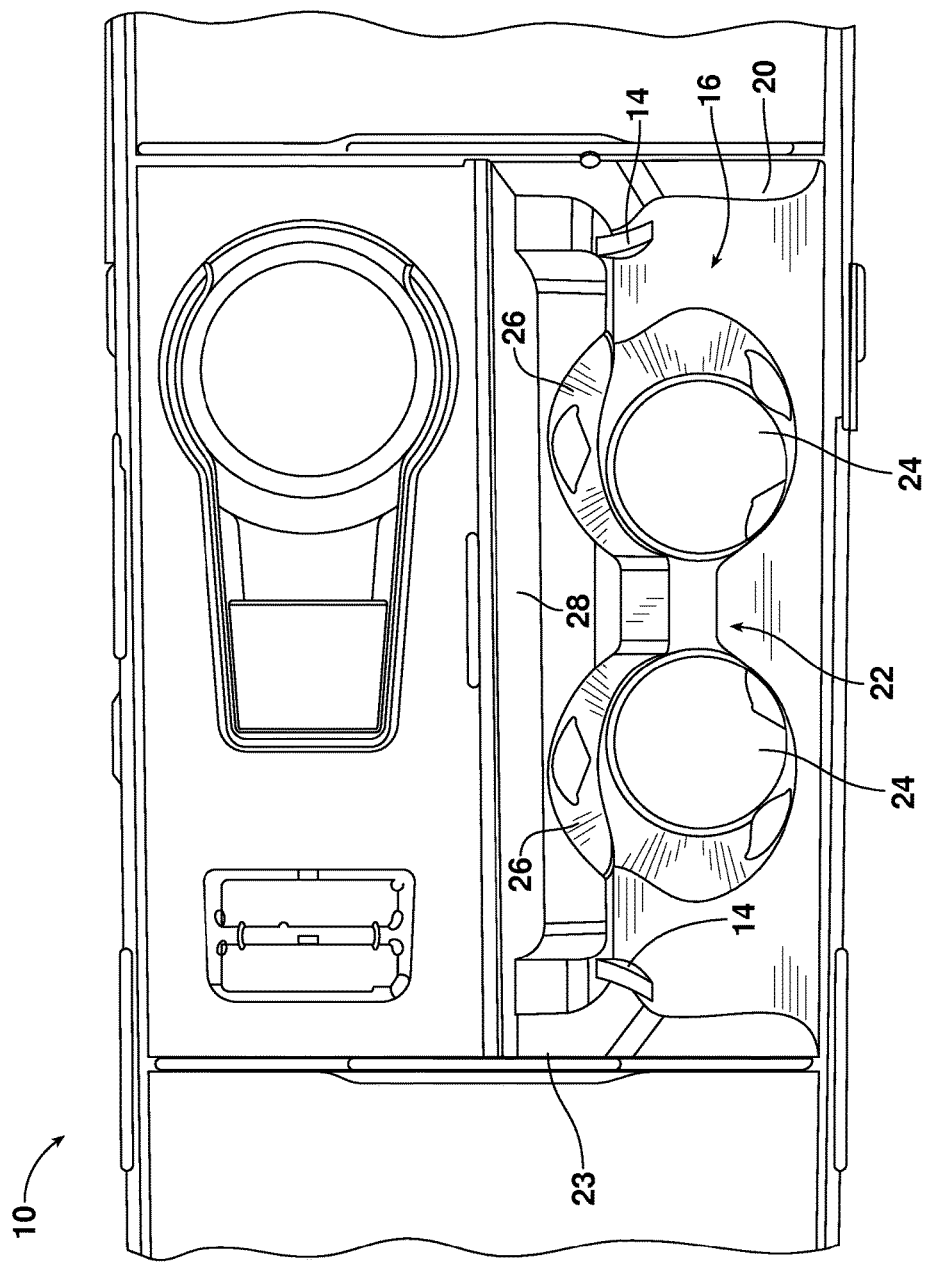
FIG. 2 is a top view of a center console assembly of a vehicle including a cup holder assembly shown in an open position revealing a compartment having a housing defining a cavity including first and second cup holder portions.

As shown in FIG. 2, the compartment 16, in the described embodiment, includes a housing 20 which defines a cavity 22 including a pocket 23 that is shaped to at least partially receive the door assembly 14 therein, when in an open position, and first and second cup holder portions 24. Portions 26 of the cup holder portions 24 can be defined on an inner member 28 of the door assembly 14. Accordingly, the described compartment 16 can be used for the securement of beverage containers (e.g., cups, bottles) with door assembly 14 forming portions 26 of the cup holder portions 24 in an open position and allowing a user to cover the compartment 16 so as to generally conceal the cup holder portions 24 when not in use, or in the closed position. In alternative embodiments, the compartment 16 and inner member 28 could be void of defined cup holder portions and simply be used for storage.

Figure 3:
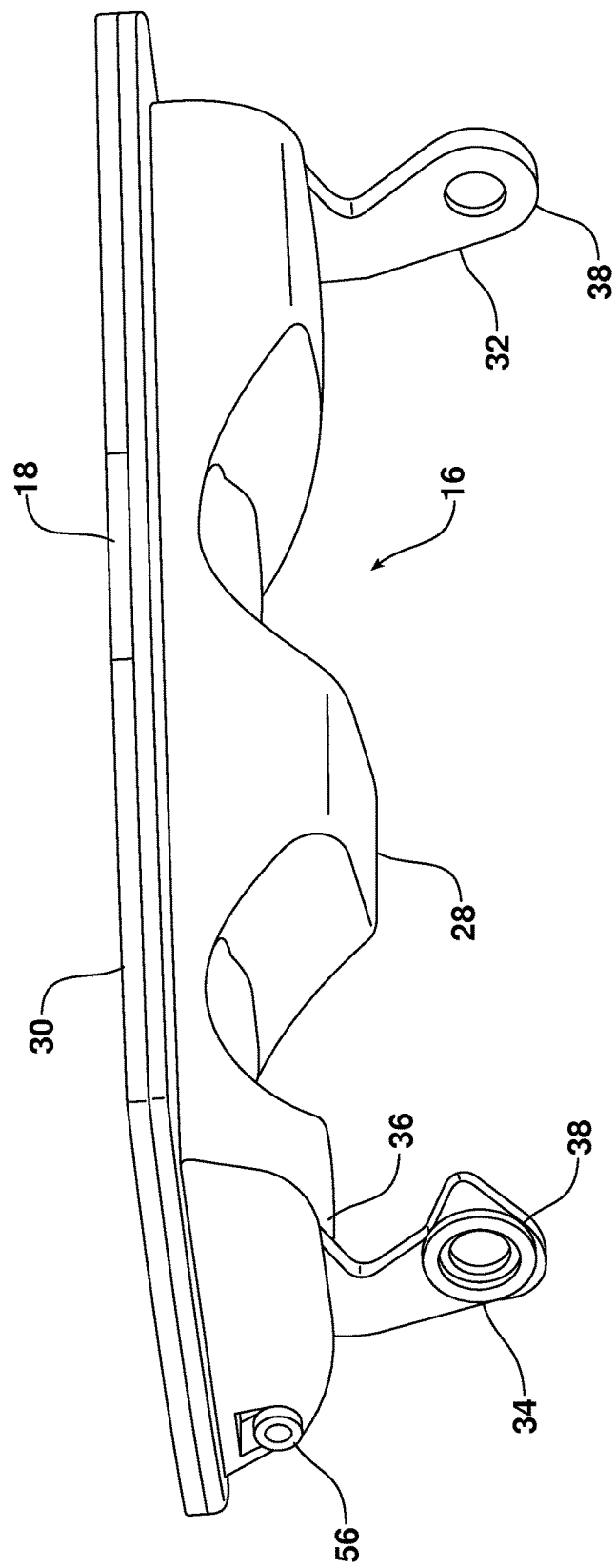
FIG. 3 is an isometric view of a door assembly for mounting over the compartment.

As best shown in FIG. 3, the door assembly 16 includes the inner member 28 and an outer member 30. As described above, the inner member 28 includes concave portions forming the portions 26 of the cup holder portions 24 in the open position. First and second arms 32, 34 are rotatably coupled to the inner member 28 and extend outward through slots 36 formed in the inner member.

As shown and described in detail in U.S. patent application Ser. No. 14/465,101, incorporated by reference herein, which is owned by the assignee of the present invention, second ends 38 of the first and second arms 32, 34 are coupled to the compartment 16. A track is fixed with the compartment 16, and a carrier 40 is pivotally coupled with the door assembly 14 and is further operably coupled with the track so as to be slidable there along. A spring is coupled between the door assembly 14 and the compartment 16 such that a contraction of the spring causes the door assembly 14 to move from a closed position with rotation of first arm 32 and movement of the carrier 40 along the track to the open position wherein the door assembly 14 is at least partially stowed in the pocket 23.

Figure 4:
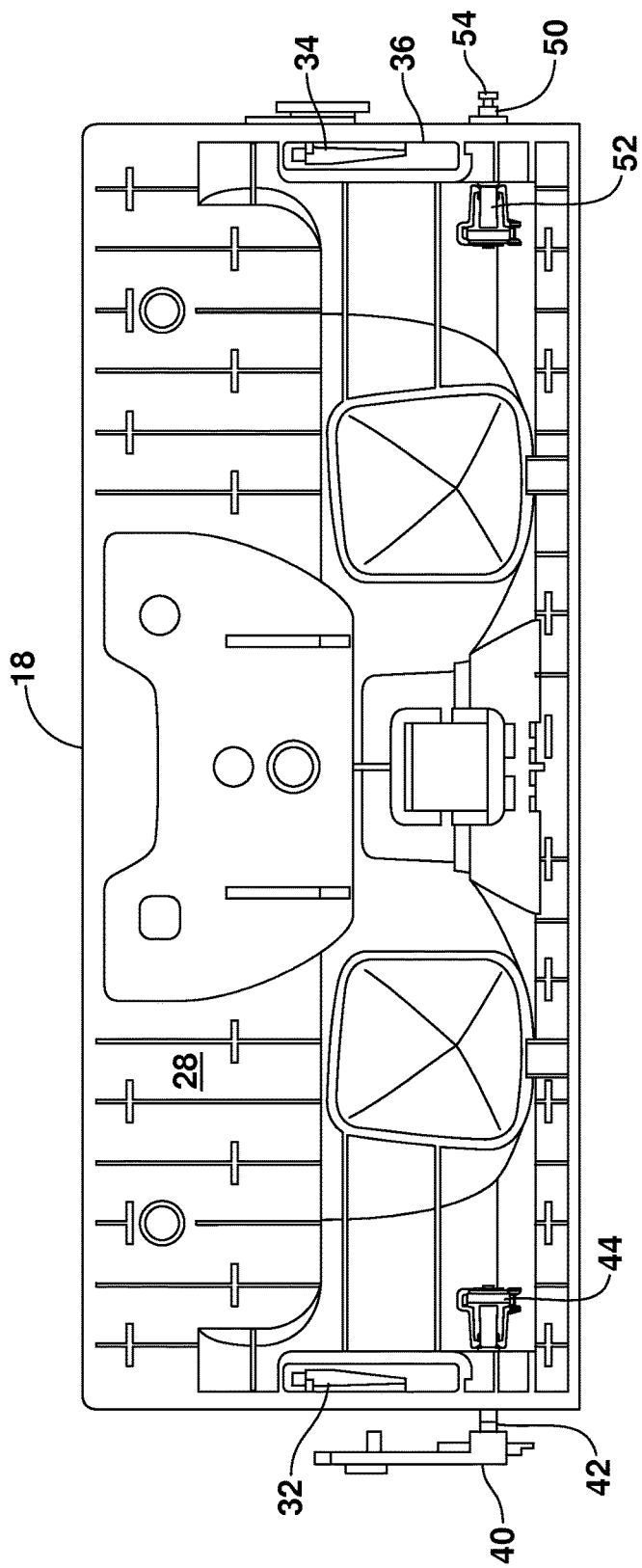
FIG. 4 is a top view of an inner member of the door assembly showing first and second clips mounted thereto for receiving first and second pins.
Figure 5:
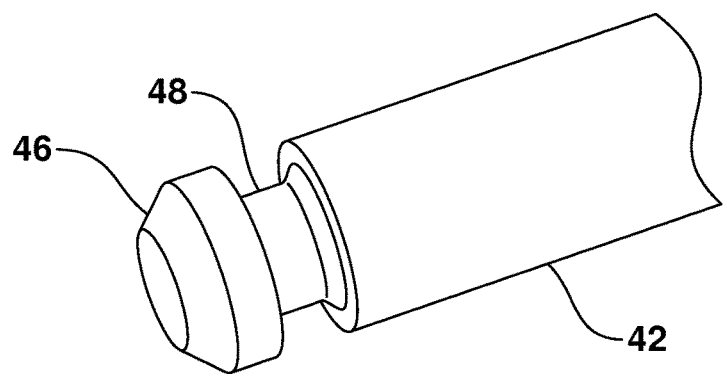
FIG. 5 is a partial perspective view of a pin.

As shown in FIG. 4, a first pin 42 is associated with the carrier 40 for rotatably coupling the carrier 40 with the door assembly 14. More specifically, the first pin 42 extends through the carrier 40 and a side wall of the inner member 28 and is secured by a first clip 44. FIG. 5 shows a portion of the first pin 42 including a tip 46 and having a groove 48 formed therein adjacent the tip. The groove 48 is designed to form a ball bearing joint with the first clip 44 as is described in more detail below. As further shown in FIG. 4, a second pin 50 similarly extends through a side wall of the inner member 28 and is secured by a second clip 52. A first end 54 of the second pin 50 extends outside of the door assembly 14 and is operatively engaged with a slot to assist proper movement of the door assembly 14 during opening and closing as further shown and described in the above-referenced U.S. patent application Ser. No. 14/465,101.

Figure 6:
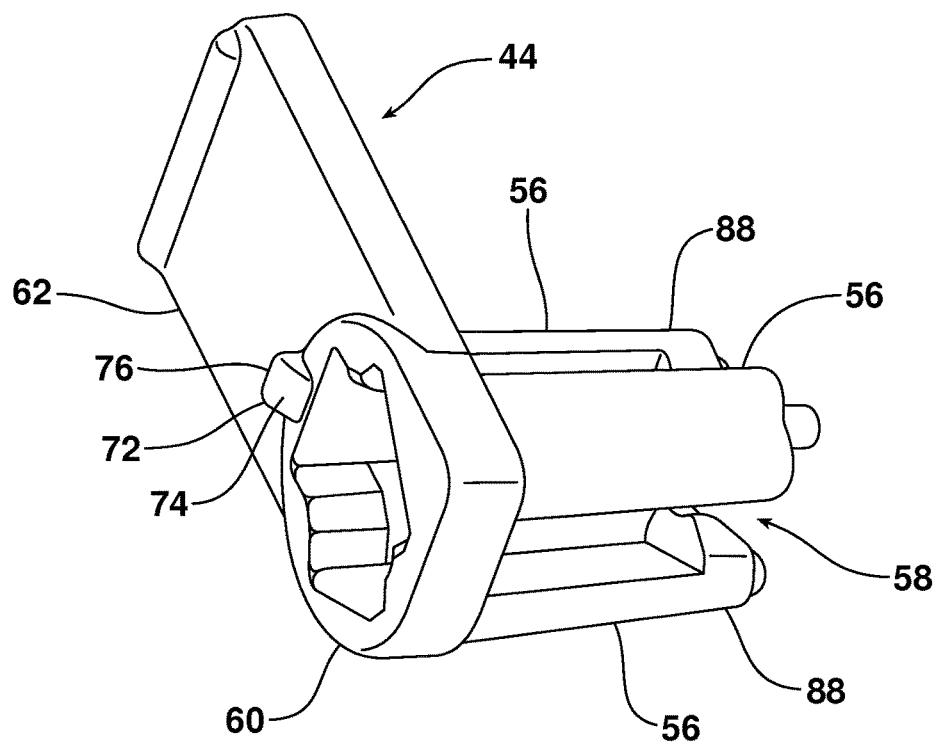
FIG. 6 is a partial perspective view of a clip.

As shown in perspective view in FIG. 6, the first clip 44 includes a plurality of fingers 56 which together form an expandable opening 58 for receiving the tip 46 of the pin 42 and retaining the pin in position. The plurality of fingers 56 are fixed to and extend from a base 60 of the clip 44. An arm 62 extends generally perpendicular to the plurality of fingers 56. The arm 62 provides a locating feature and assists in securing the clip 44 between the inner and outer members 28, 30 as will be further described with regard to FIG. 9. Although the first clip 44 is shown and described in FIG. 6, it should be noted that the first and second clips 44, 52 are identical as are at least the portions of the pins 42 and 50 which engage the clips.

Figure 7:
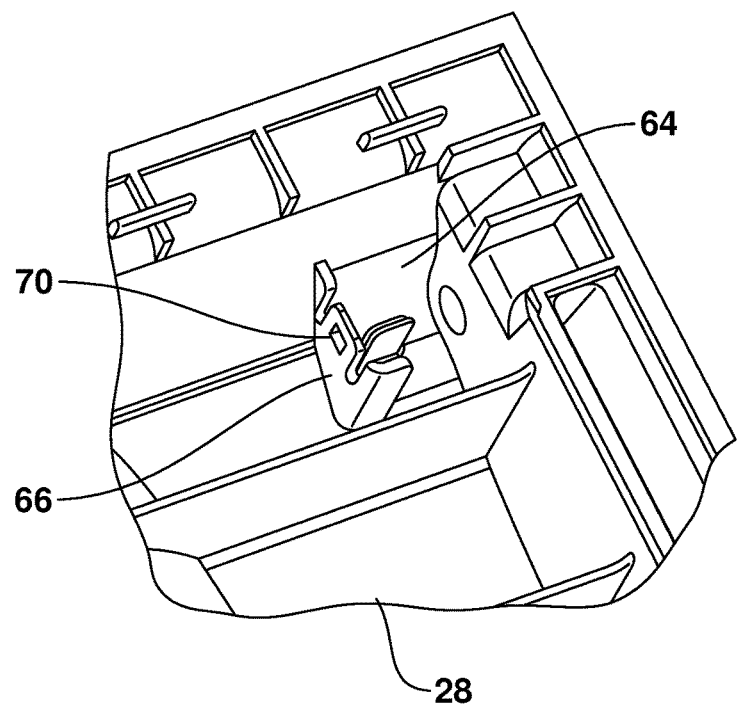
FIG. 7 is a partial perspective view of the inner member of the door assembly including a pocket for receiving the clip.

Prior to being used to locate the outer member 30, the clips 44, 52 are positioned on and partially secured to the inner member 28. As best shown in FIG. 7, a pocket 64 is formed on the inner member 28 of the door assembly 14 for receiving the clip 44. An identical pocket is formed on an opposite end of the inner member 28 of the door assembly 14 for receiving the clip 52 and pin 50 as shown in FIG. 4. In the described embodiment, the pocket 64 is integrally molded with the inner member 28. Alternate embodiments may have a separate pocket attached to the inner member.

Figure 8:
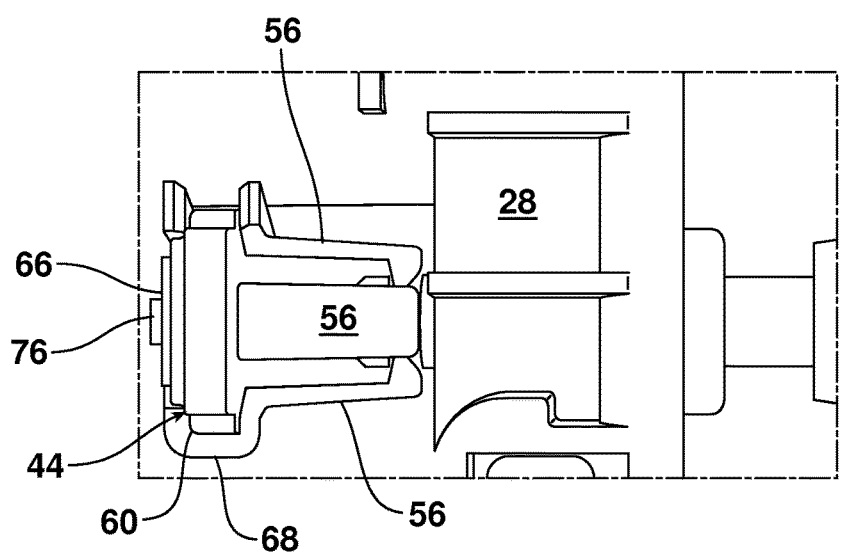
FIG. 8 is a partial top view of the inner member of the door assembly showing a clip positioned within the pocket and having a pin secured therein.

As shown in FIGS. 7 and 8, the pocket 64 includes a wall 66 extending generally from the inner member 28 toward the outer member 30. The wall 66 forms at least a portion of a channel 68 that receives the base 60 of the clip 44, and includes an aperture 70 therein. A projection 72 extends from the base 60 of the clip 44 in a direction opposite a direction the plurality of fingers 56 extend. In an alternate embodiment, the projection may extend from the arm 62 and provide the same function. When the clip 44 is placed into the pocket 64, the projection 72 extends through the aperture 70. The projection 72 includes an angled outer surface 74 for ease of installment and a planar upper surface 76 (best shown in FIG. 9) which prevents upward movement of the clip 44 once installed. The channel 68 similarly prevents lateral movement once seated or installed against the inner member 28.

Figure 9:
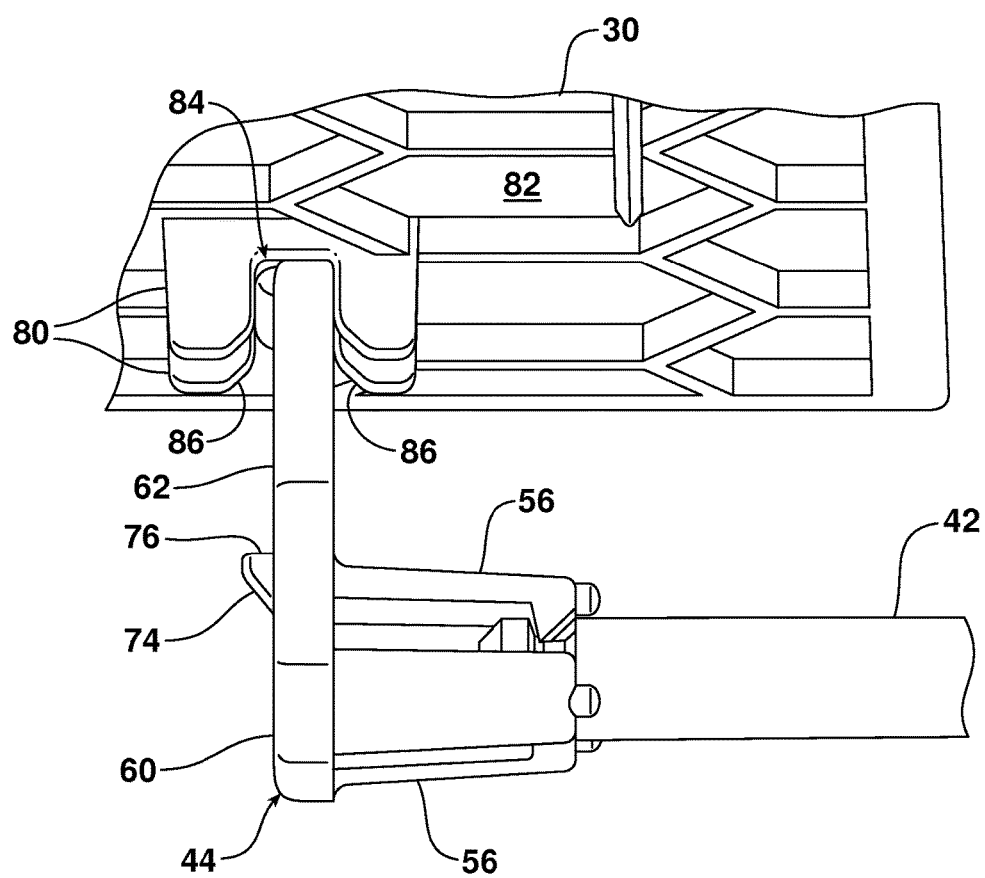
FIG. 9 is partial isometric view of an arm of a clip extending toward and being received within a channel formed by tabs extending from the inner member of the door assembly for locating and retaining the clip in position.

As shown in FIG. 9, tabs 80 formed in and extending inward from an interior side 82 of the outer member 30 form a channel 84 for receiving the arm 62 of the clip 44. More specifically, the tabs 80 include chamfers 86 angled toward the channel 84 for directing the arm 62 into the channel and positioning the outer member 30 relative the inner member 28 during the manufacturing process. Once positioned, the inner and outer members 28, 30 are welded together as described above. Even more, the tabs 80 retain the arm 62 and prevent movement of the clip 44 between the inner and outer members 28, 30 once the inner and outer members are welded together.

As further shown in FIG. 10, the clip 44 is received by pocket 64 of inner member 28 and secured between the inner and outer members 28, 30 which are welded together prior to coupling with the compartment 16. Since the clip 44 is welded in between the inner and outer members 28, 30, it is imperative that the clip 44 is capable of retaining the first and second pins 42, 50 in position during the function of door assembly 14 movement for a significant number of cycles of the door assembly. In the described embodiment, the inner and outer members 28, 30 are ultrasonically welded but other means of attaching the inner and outer members together may be utilized.

In this position, the first and second clips 44 and 52 are ready to receive the first and second pins 42 and 50 respectively. Once the inner and outer members 28, 30 are welded together, the arms 32, 34 are coupled to the compartment 16 and the first and second pins 42, 50 are then pressed through the inner member 28 and into the openings 58 formed by the plurality of fingers 56 of each clip. When inserted through the inner member 28 and aperture, the tip 46 of the pin 42 engages or contacts the opening 58 formed by the plurality of fingers 56 and, more specifically, by inwardly projecting tabs 90 adjacent second ends 88 of the plurality of fingers as shown sequentially in FIGS. 11a-11c.

This engagement through movement of the pin 42 (shown by action arrow A) forces the plurality of fingers 56 to flex outward (shown by action arrow B) expanding the size of the opening 58 from its initial size in a natural position. Once the tip 46 of the pin 42 has been inserted a certain distance, the inwardly projecting tabs 90 align with, or are positioned over, the groove 48. A force resistant to the outward movement or flexing of the plurality of fingers 56 created by the resiliency of the clip material forces the inwardly projecting tabs 90 to enter the groove 48 (shown by action arrow C) allowing the plurality of fingers 56 to return to the natural position wherein the pin 42 is secured in position within the clip 44.

In the described embodiment, the clip 44 is a polyoxymethylene, an acetal, or a poly formaldehyde material. In alternate embodiments, however, the clip 44 can be made of any material capable of allowing ends of the plurality of fingers 56 forming the opening 58 to flex outwardly allowing insertion of the pin 42 and to return to a natural position once the pin is inserted. Once the pin 42 is secured by the door assembly 14 and arms 32, 34 coupled to the compartment assembly 16 of the vehicle, the door assembly 10 is ready for operation.

In summary, numerous benefits result from utilization of clips having a plurality of extendable fingers for receiving and retaining pins within a door assembly for a vehicle as illustrated in this document. The retaining clips are made of a robust material, as described above, and are secured in position between inner and outer members of the door assembly to prevent disengagement of the pins during opening and closing cycles of the door. The clips are capable of retaining the pins in position for a significant number of cycles of the door assembly which is particularly important given the fact that the clips are positioned within the welded door assembly making it difficult to repair.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A clip for receiving a pin in a door assembly in a vehicle, comprising:
    a base;
    a plurality of fingers extending from said base and forming an expandable opening for receiving the pin, each of said plurality of fingers including an inwardly projecting tab at least partially defining the expandable opening; and
    an arm extending from said base for securing the clip within said door assembly.

2. The clip for use in a door assembly in a vehicle of claim 1, wherein said base is substantially perpendicular to said arm extending from said base.

3. The clip for use in a door assembly in a vehicle of claim 2, further comprising a projection extending from said base in a direction generally opposite a direction said plurality of fingers extend from said base for at least partially securing said clip in position within said door assembly.

4. The clip for use in a door assembly in a vehicle of claim 1, wherein each of said inwardly projecting tabs at least partially define the expandable opening such that a tip of the pin contacts said inward projecting tabs during insertion of the pin causing said plurality of fingers to expand outward to an expanded position allowing the pin to enter the expandable opening until said inward projecting tabs align with a groove formed in the pin adjacent the tip wherein said inward projecting tabs enter the groove allowing said plurality of fingers to return to a natural position and secure the pin in position.

5. The clip for use in a door assembly in a vehicle of claim 4, wherein said inwardly projecting tabs of said plurality of fingers form a ball bearing joint with the groove in the pin.

6. The clip for use in a door assembly in a vehicle of claim 4, wherein said base is substantially perpendicular to said arm extending from said base.

7. The clip for use in a door assembly in a vehicle of claim 4, further comprising a projection extending from said base opposite said plurality of fingers for securing said clip in position within said door assembly.

8. The clip for use in a door assembly in a vehicle of claim 4, wherein the clip is a polyoxymethylene, an acetal, or a poly formaldehyde.

9. A vehicle incorporating the clip claim 4.

10. A clip for receiving a pin in a door assembly in a vehicle, comprising:
 a base;
 a plurality of fingers extending from said base and forming an expandable opening for receiving the pin;
 an arm extending from and substantially perpendicular to said base for securing the clip within said door assembly; and
 a projection extending from said base in a direction generally opposite a direction said plurality of fingers extend from said base for at least partially securing said clip in position within said door assembly.

11. The clip for use in a door assembly in a vehicle of claim 10, further comprising a projection extending from said arm in a direction generally opposite a direction said plurality of fingers extend from said base for at least partially securing said clip in position within said door assembly.

12. The clip for use in a door assembly in a vehicle of claim 10, wherein each of said plurality of fingers includes an inwardly projecting tab at least partially defining the expandable opening.

13. The clip for use in a door assembly in a vehicle of claim 12, wherein the tip of the pin contacts said inwardly projecting tabs during insertion of the pin causing said plurality of fingers to expand outward to an expanded position allowing the pin to enter the expandable opening until said inward projecting tabs align with a groove formed in the pin adjacent the tip wherein said inward projecting tabs enter the groove allowing said plurality of fingers to return to a natural position and secure the pin in position.

14. The clip for use in a door assembly in a vehicle of claim 12, wherein said inwardly projecting tabs of said plurality of fingers form a ball bearing joint with the groove in the pin.

15. The clip for use in a door assembly in a vehicle of claim 10, wherein the clip is a polyoxymethylene, an acetal, or a poly formaldehyde.

16. A vehicle incorporating the clip claim 10.

17. The clip for use in a door assembly in a vehicle of claim 10, wherein said plurality of fingers includes at least three fingers.

* * * * *